May 20, 1941.　　　J. C. TAYLOR, JR　　　2,242,628
AIRPLANE LAUNCHING DEVICE
Filed Feb. 9, 1939　　　3 Sheets-Sheet 1
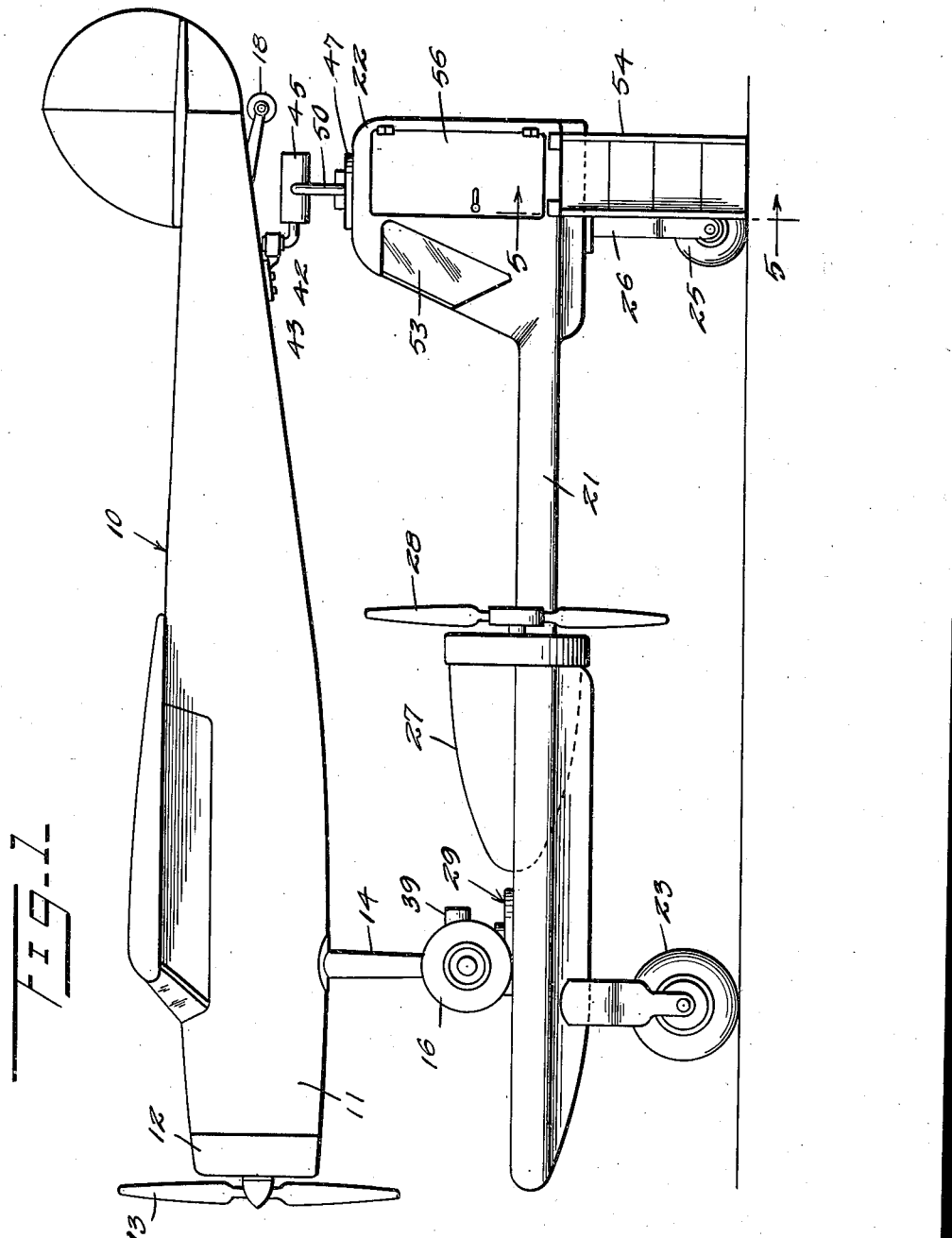
J.C.Taylor, Jr
INVENTOR
BY Victor J. Evans & Co.
ATTORNEYS May 20, 1941.  J. C. TAYLOR, JR  2,242,628
AIRPLANE LAUNCHING DEVICE
Filed Feb. 9, 1939  3 Sheets-Sheet 2
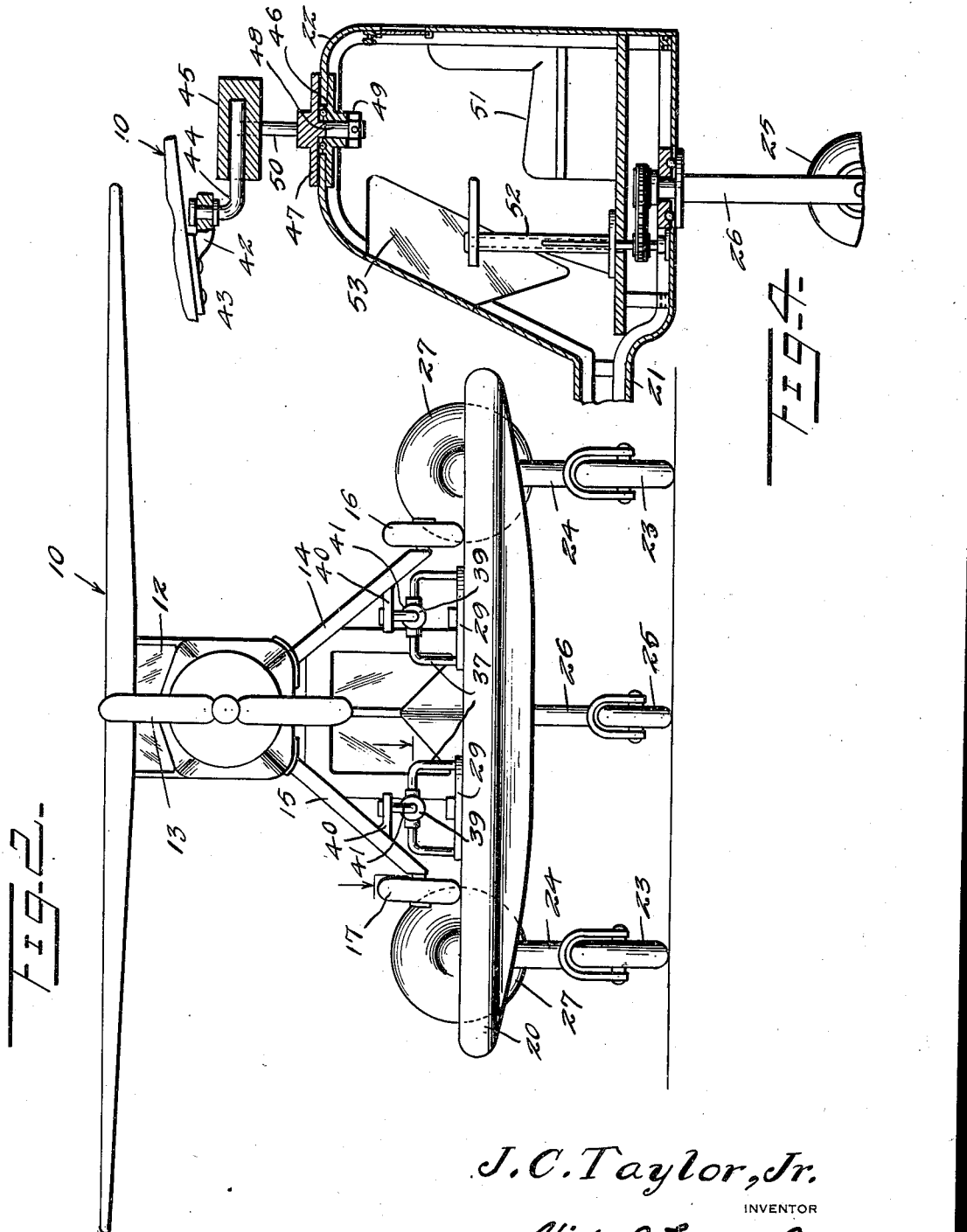
J. C. Taylor, Jr.
INVENTOR
BY Victor J. Evans & Co.
ATTORNEYS

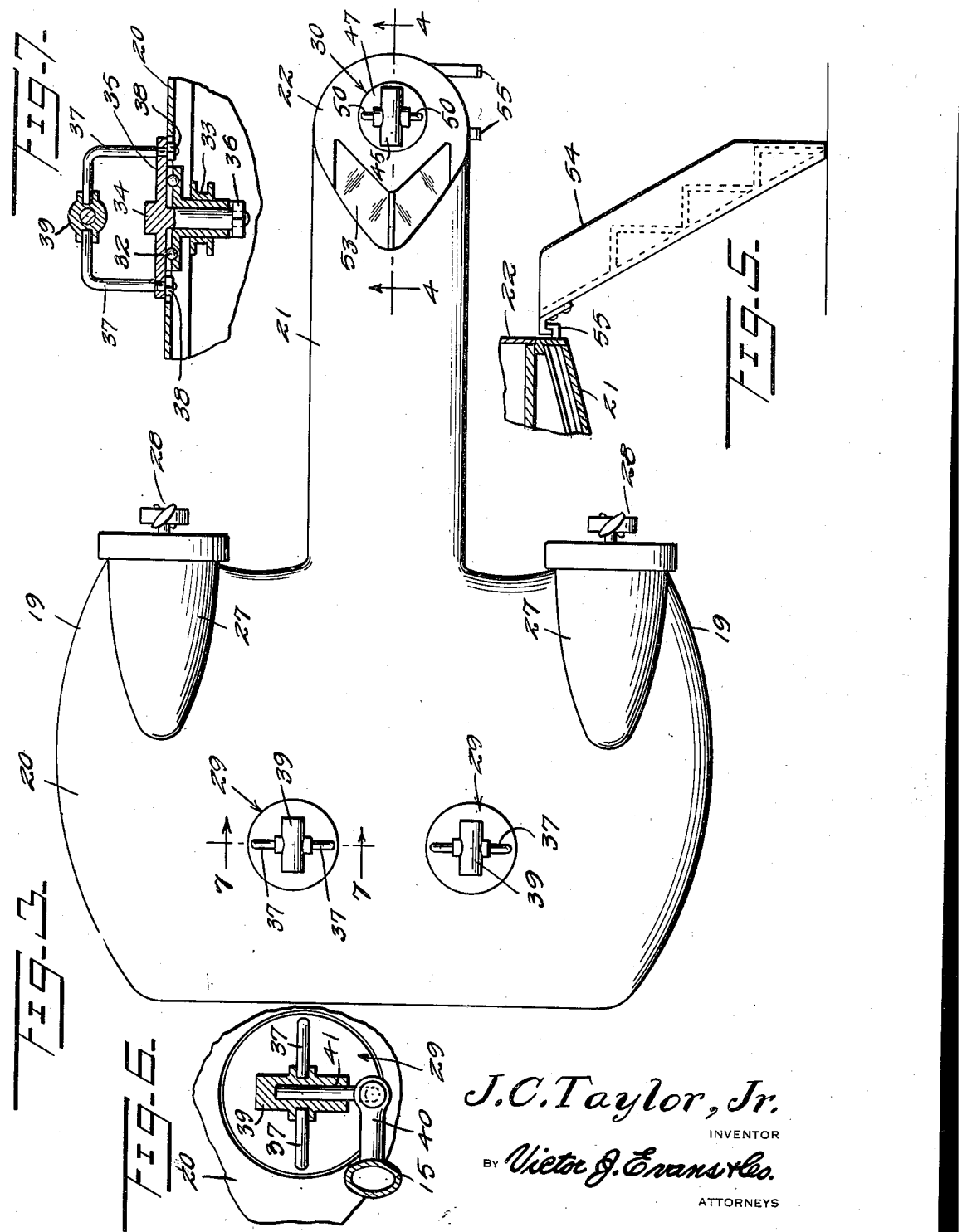

Patented May 20, 1941

2,242,628

UNITED STATES PATENT OFFICE 2,242,628

AIRPLANE LAUNCHING DEVICE

James C. Taylor, Jr., Charleston, S. C.

Application February 9, 1939, Serial No. 255,517

4 Claims. (Cl. 244—63)

The present invention relates to new and improved airplane launching devices.

As is generally known, a heavily loaded plane requires a longer runway in order to attain sufficient speed to rise from the ground. It is, therefore, an important object of the present invention to provide novel means for assisting an airplane to obtain the required speed and momentum within a shorter runway to form a sufficient vacuum on the trailing edge of the wing for safe launching.

The herein described invention comprises a carriage propelled by motor means and provided with ground-engaging wheels for travel over the landing field. A pilot's cabin is formed in the tail of the carriage and includes the required instruments for control of the same. The airplane to be launched is attached to the carriage and above the same through the medium of connecting means preferably in the form of universal type joints. Suitable members extend from the plane and are adapted to be disposed in a socket carried by the universal joint, the universal joint and members being rotatable whereby the plane can be released therefrom regardless of the angle of the same.

The invention will be fully and comprehensively understood from a consideration of the following detailed description when read in connection with the accompanying drawings which form a part of the application.

In the drawings:

Figure 1 is a side elevational view illustrating an airplane in position on the new and improved carriage for launching.

Figure 2 is a front elevational view thereof.

Figure 3 is a top plan view of the launching carriage.

Figure 4 is a transverse sectional view of the carriage and taken substantially on line 4—4 of Figure 3.

Figure 5 is a vertical sectional view taken substantially on line 5—5 of Figure 1.

Figure 6 is a longitudinal sectional view through the attaching means of the carriage and taken substantially on line 6—6 of Figure 2, and Figure 7 is a sectional view taken substantially on line 7—7 of Figure 3.

It is to be understood, that the launching carriage within the meaning of the present invention, is adapted for use with any type airplane that must be driven a relatively long distance by its propellers before attaining sufficient speed for taking off into the air, and is therefore, not limited to the type of airplane illustrated in the drawings.

For purposes of illustration, the airplane illustrated is of the monoplane type generally designated by the reference numeral 10 and comprises a fuselage 11, and one or more motors 12 for driving the propeller or propellers 13. The conventional landing gear including the angularly disposed forward struts 14 and 15 depends from the fuselage and supports thereon in suitable bearings ground-engaging wheels 16 and 17 respectively. A rear wheel 18 is mounted on and supports the tail of the craft.

Instead of the front and rear wheels, which normally support the airplane 10, and are utilized for carrying the craft the required distance for attaining sufficient speed for taking off into the air, the present invention provides for the employment of a launching carriage generally designated by the reference numeral 19 comprising a relatively large wing or supporting surface 20 on the front of the device and a reduced body portion 21 extending rearwardly therefrom on the extreme point of which is constructed a cabin 22 sufficiently large to accommodate the operator of the device. The launching carriage 19 is supported on a pair of front ground-engaging wheels 23 supported in suitable bearings on their respective shafts 24 depending from the bottom surface of the wing 20. A single ground-engaging wheel 25 is carried by a supporting shaft 26 depending from the tail portion of the carriage and substantially beneath the cabin 22. The carriage is driven by one or more suitable motors 27 mounted on the upper surface of the wing 20, and driving the propellers 28. Suitable means, not shown, for controlling operation of the motors 27 is provided within the operator's cabin 22.

As is to be understood, the carriage 19 is adapted to support the craft 10 and to cooperate with the same to obtain the required speed for permitting the plane, when heavily loaded or otherwise, to take off into the air. As will hereinafter appear, it is also necessary to modify the conventional landing gear of the airplane to adapt the same for use with the improved launching device. The attaching means includes the provision of a pair of supporting standards generally designated by the reference numeral 29 on the wing 20 and a single supporting standard 30 attached to and disposed above the cabin 22. The supporting standards 29 include a rod mounted for rotation in a bearing 32 carried by a bracket 33 attached to the wing 20, more clearly shown in Figure 7 of the drawings. It is to be understood that the wing 20 is to be modified in order to accommodate the bracket 33 and bearing plate 32. The upper end of the rod is enlarged as indicated at 34 for retaining thereon a plate 35 said rod and plate being suitably clamped by means of a lock nut or the like 36. Thus it will be seen that the rod and plate 34 are free for rotation in the bearing 32 and bracket 33.

A pair of L-shaped arms 37 are secured by means 38 to the plate 35 and the inwardly extending portions of the arms support a socket 39. The socket 39 is held by the arms 37 in a manner for free oscillation therein as well as rotating with the shaft and plate 35.

As afore indicated, it is necessary to modify the landing gear of the conventional airplane in order to adapt the same for use with the present launching device, the same including a bracket 40 welded or otherwise secured to a respective strut 14 and 15 and carrying therein an L-shaped hook 41 adapted to be positioned within its respective socket 39. Thus it will be seen that each of the forward struts of the landing gear is frictionally held by means of the hooks 41 within the socket 39 of the universal type joint connecting means 29. The connections 29 are, of course, appropriately spaced on the wing 20 to align with the hooks 41 carried by the landing gear of the plane 10.

Means is also provided for removably supporting the tail of the craft, said means being more clearly illustrated in Figure 4 of the drawings. It will be noted that a bracket 42 is clamped or otherwise secured as indicated at 43 beneath the tail of the craft and supports therein an L-shaped hook 44 engageable with a socket 45 universally mounted on the top of the cabin 22. The top of the cabin 22 is partially cut out to receive a bearing plate 46 bolted or otherwise secured to a top plate 47 which plate has integral therewith a rod 48 the end of which is bolted or otherwise secured to the plate 46 as indicated at 49. A pair of L-shaped arms 50 extend from the top plate 47 the inner extending ends of which support the socket 45, said socket being also adapted to oscillate on the arms 50 and, the plate 47 and its attached arms 50 and socket 45 are free to rotate on the shaft 48. Mounting the forward and rear ends of the craft 10 in the respective sockets 39 and 45 provides sufficient support for the plane for launching. The pilot of the plane 10 and the pilot of the carriage 19 operate their respective motors simultaneously and the combined power of the craft and launching device provides sufficient speed in a shorter distance to permit the plane to take off into the air. The plane will be released from the sockets 39 and 45 by shutting off the motors 27, which takes place after flying speed has been attained, whereby it may take off into the air under its own power. The universal mounting of the sockets 39 and 45 permits the plane to take off regardless of the angle of the same so that it will always be free to be released when cutting off the power of the motors of the launching device.

The cabin 22 is provided with a pilot's seat 51 and the steering mechanism generally designated at 52 whereby the carriage 19 is guided through the wheel 25 and shaft 26 disposed beneath the cabin 22. The occupant of the cabin obtains clear vision of the field through a windshield 53 formed in the front of the device and access to the cabin is obtained by a ladder or the like 54 adapted to be supported on an arm 55 projecting from the body of the cabin which can be released prior to the take off of the plane, the ladder preferably being disposed in line with a door covered outlet 56.

It will be readily seen that there is provided a launching carriage driven by appropriate means and controlled from a cabin forming a part of the device. The airplane will be securely held on the device until the motors of the same are suddenly cut off after flying speed has been obtained thus permitting the plane to take off into the air under its own speed. By use of the launching device, relatively long runways for obtaining the required speed are unnecessary and heavily loaded planes may take off in a much shorter distance than at present required.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawings nor to the precise construction described and, therefore, such changes and modifications may be made therein as do not affect the spirit of the invention nor exceed the scope thereof as expressed in the appended claims.

What is claimed is:

1. A launching device for airplanes comprising, a power operated carriage adapted to support the airplane being launched, said carriage including a supporting wing-like member and a reduced body portion extending rearwardly therefrom, a pair of rotatable supporting standards mounted in spaced relation on said wing-like member, an oscillating socket carried by each standard and adapted to frictionally retain arms extending from the landing gear of an airplane to be launched, and socket means carried by said reduced body portion for frictionally retaining an arm extending from the tail of the airplane whereby said airplane will be released from said sockets upon shutting off the power of said carriage.

2. A launching device for airplanes comprising, a carriage adapted to be power driven for attaining airplane take-off speed, said carriage including a supporting wing-like member and a reduced body portion extending rearwardly therefrom, said carriage being mounted on front and rear ground-engaging wheels, airplane supporting means rotatably mounted on said carriage, said means comprising a pair of standards mounted in spaced relation on said wing-like member, an oscillating socket carried by each standard and adapted to frictionally retain arms extending from the landing gear of an airplane to be launched, and means carried by said reduced body portion for frictionally retaining an arm extending from the tail of the airplane whereby said airplane will be released from said sockets upon reducing the speed of said carriage.

3. A launching device for airplanes, comprising a carriage adapted to be power driven for attaining airplane take-off speed, said carriage including a supporting wing-like member and a reduced body portion extending rearwardly therefrom, said reduced body portion being formed with a cabin-like structure projecting therefrom adapted to contain the means for controlling operation of said carriage, airplane supporting means rotatably mounted on said carriage, said means including a pair of standards mounted in spaced relation on said wing-like member, an oscillating socket carried by each standard and adapted to frictionally retain arms extending from the landing gear of an airplane to be launched, and means carried by said cabin-like structure for frictionally retaining an arm extending from the tail of the airplane whereby said airplane will be supported in a substantially horizontal position and will be released from said sockets upon reducing the speed of said carriage.

4. A launching device for airplanes, comprising a carriage adapted to be power driven for attaining airplane take-off speed, said carriage including a supporting wing-like member and a reduced body portion extending rearwardly therefrom, the reduced body portion including a cabin-like structure projecting therefrom adapted to contain the means for controlling operation of said carriage, airplane supporting means rotatably mounted on said carriage, said means including a pair of standards mounted in spaced relation on said wing-like member, each standard comprising a pair of vertically projecting L-shaped arms supporting an oscillating socket therebetween, said oscillating sockets adapted to frictionally retain arms extending from the landing gear of an airplane to be launched, and a standard rotatably mounted on said cabin-like structure and including a pair of L-shaped arms supporting an oscillating socket therebetween adapted to frictionally retain an arm extending from the tail of the airplane whereby said airplane will be supported in a substantially horizontal position and will be released from said sockets upon reducing the speed of said carriage.

JAMES C. TAYLOR, Jr.